United States Patent
Igarashi et al.

(10) Patent No.: US 6,189,379 B1
(45) Date of Patent: *Feb. 20, 2001

(54) THERMAL TYPE AIR FLOW MEASURING INSTRUMENT FOR INTERNAL COMBUSTION ENGINE

(75) Inventors: Shinya Igarashi, Ibaraki-ken; Chihiro Kobayashi, Hitachinaka; Hiroshi Hirayama, Hitachinaka; Takayuki Saito, Hitachinaka; Nobukatsu Arai, Ushiku, all of (JP)

(73) Assignees: Hitachi, Ltd., Tokyo; Hitachi Automotive Engineering Co., Ltd., Hitachinaka, both of (JP)

(*) Notice: Under 35 U.S.C. 154(b), the term of this patent shall be extended for 0 days.

This patent is subject to a terminal disclaimer.

(21) Appl. No.: 09/362,190

(22) Filed: Jul. 28, 1999

Related U.S. Application Data (60) Continuation of application No. 09/112,144, filed on Jul. 9, 1998, now Pat. No. 5,939,628, which is a division of application No. 08/452,867, filed on May 30, 1995, now Pat. No. 5,789,673.

(30) Foreign Application Priority Data

May 30, 1994 (JP) .................................................. 6-116240

(51) Int. Cl.$^7$ ....................................................... G01F 5/00
(52) U.S. Cl. ................................................................. 73/202
(58) Field of Search ...................................................... 73/202

(56) References Cited

U.S. PATENT DOCUMENTS

| | | |
|---|---|---|
| 4,709,581 | 12/1987 | Nishimura et al. . |
| 4,879,898 * | 11/1989 | Bamer .................................. 73/199 |
| 4,974,445 | 12/1990 | Arai et al. . |
| 5,467,648 * | 11/1995 | Igarashi et al. ....................... 73/202 |
| 5,537,870 * | 7/1996 | Zurek et al. ........................... 73/202 |
| 5,581,026 * | 12/1996 | Sawada et al. ......................... 73/202 |
| 5,789,673 * | 8/1998 | Igarashi et al. ..................... 73/202.5 |
| 5,939,628 * | 8/1999 | Igarashi et al. ....................... 73/202 |

FOREIGN PATENT DOCUMENTS

| | | |
|---|---|---|
| 0 175 077 | 3/1986 | (EP) . |
| 0 386 966 | 9/1990 | (EP) . |
| 0 441 523 A1 | 8/1991 | (EP) . |
| 0 558 626 | 3/1994 | (EP) . |
| 2-41688 | 9/1990 | (JP) . |

OTHER PUBLICATIONS

European Search Report dated Jul. 18, 1996.

\* cited by examiner

*Primary Examiner*—Benjamin R. Fuller
*Assistant Examiner*—Jewel V. Thompson
(74) *Attorney, Agent, or Firm*—Evenson, McKeown, Edwards & Lenahan, P.L.L.C.

(57) ABSTRACT

A thermal type air flow measuring instrument is mounted to a main passage forming an intake air passage of an internal combustion engine and is provided. with an auxiliary passage which includes a heating resistor and a temperature sensing resistor therein and an electronic circuit which is electrically connected to the heating resistor and the temperature sensing resistor. The auxiliary passage is a passage including at least one bent portion composed of a first path substantially parallel to the main passage and a second path having a path different in flow direction from the first path. A member forming the auxiliary passage is fixed in a united form to only a case member for interiorly protecting the electronic circuit, and the case member is fixed to the outer wall surface of the intake air passage. The auxiliary passage structure capable of being handled as a single module united to the case member is effective to the mass production of an air flow control system and the reduction in cost thereof since the structure can be mounted to different kinds of internal combustion engines.

11 Claims, 7 Drawing Sheets

THERMAL TYPE AIR FLOW MEASURING INSTRUMENT FOR INTERNAL COMBUSTION ENGINE

This application is a continuation of application Ser. No. 09/112,144, filed Jul. 9, 1998, now U.S. Pat. No. 5,939,628, which is a division of application Ser. No. 08/452,867, filed May 30, 1995, now U.S. Pat. No. 5,789,673.

BACKGROUND OF THE INVENTION

The present invention relates to an air flow measuring instrument which forms an intake system of an internal combustion engine and measures an intake air flow of the intake system, and more particularly to a thermal type air flow measuring instrument suitable for measurement of an air flow taken in an engine of an automobile.

The prior art reference most relevant to the present invention includes U.S. Pat. No. 4,974,445 (corresponding to JP-A-2-1518). An air flow meter disclosed by the JP-A-02-1518 includes a substantially L-shaped auxiliary passage formed in a main passage by cast molding. An opened outlet surface of the auxiliary passage is provided in a plane parallel to the main passage. Thus, the disclosed air flow meter has not a construction in which the auxiliary passage is inserted into the main passage but a construction in which the main passage and the auxiliary passage are cast-molded simultaneously. Accordingly, there is an inconvenience that at least two complicated casts or molds are required and hence it is difficult to reduce the fabrication cost. In connection with this, the present invention is easy to reduce the fabrication cost since a main passage can be fabricated with a simple construction independently or by itself. The U.S. Pat. No. 4,974,445 includes a disclosure concerning the possibility of insertion of an auxiliary passage into the main passage but no disclosure concerning the detailed construction thereof. Also, in this prior art, since the length of a first path of the auxiliary passage is very large as compared with that of a second path thereof, there is an inconvenience that an error of the mounting position of the auxiliary passage including a heating resistor and so forth gives a great influence on the accuracy of measurement. To the contrary, in the present invention, since the length of a first path of the auxiliary passage is not very large as compared with that of a second path thereof or is about two times as large as that of the second path, the influence of the mounting position error on the accuracy of measurement can be reduced remarkably.

Also, an air flow measuring instrument disclosed by U.S. Pat. No. 4,709,581 (corresponding to JP-4-753853) is known. However, the U.S. Pat. No. 4,709,581 has no disclosure concerning a method for mounting and fixing a main passage, an auxiliary passage and circuit portions. Further, the air flow measuring instrument disclosed by the U.S. Pat. No. 4,709,581 has a structure in which the auxiliary passage is supported in a bridge form in the main passage with opposite ends of the auxiliary passage supported by the main passage so that a member forming the auxiliary passage completely goes across the inner diameter of the main passage. That is, the instrument disclosed by the U.S. Pat. No. 4,709,581 has not a structure, intended by the present invention, in which a circuit portion and an auxiliary passage portion are configured into a unitary module so that the module standardized independently of the size of the main passage is applicable to various internal combustion engines. Furthermore, the instrument disclosed by the U.S. Pat. No. 4,709,581 has not been put into practice because the deterioration of the accuracy of measurement is feared since the auxiliary passage has the above-mentioned bridge-like structure so that the auxiliary passage is complicatedly curved or bent and because the cost becomes high since the instrument must be formed by coupling several parts. The instrument disclosed by the U.S. Pat. No. 4,709,581 is not a structure in which sufficient consideration is given to a measure to counter the change of environment due to the arrangement of the main passage at different positions of an intake system and a measure to counter the variations of mounting of the module and the main passage.

SUMMARY OF THE INVENTION

An object of the present invention is to attain the reduction of the system cost of an internal combustion engine as the greatest subject of a thermal type air flow measuring instrument by making a unitary module of a circuit portion and an auxiliary passage portion have the most of the function of the thermal type air flow measuring instrument so that the module can be handled as one product. Another object of the present invention is to make it truly possible to put a thermal type air flow measuring instrument into practice by reducing the deterioration of the accuracy of measurement caused by the reduction in size and weight, the change of environment and the variations of mounting and by improving the handling operability.

For the purpose of the reduction of the system cost of an internal combustion engine, there are contemplated the reduction of the system cost of a thermal type air flow measuring instrument and the reduction of the number of parts of the system by the unification to other parts of an intake system. A circuit portion and an auxiliary passage portion are first united in a module, thereby enabling a great reduction in cost by constructing a flow meter body of a relatively high cost by a main passage which is a simple pipe passage, a hole which is provided in the wall surface of the main passage and a surface which is for fixing the circuit. Also, parts forming the auxiliary passage portion are simplified in form and reduced in size to facilitate the unification to the circuit portion, thereby attaining the unification of parts connecting the circuit portion and the auxiliary passage portion to achieve the reduction of the cost of the air flow measuring instrument. Further, since the form of the flow meter body is simplified, it becomes possible to form the flow meter body in a united form to other parts of the intake system without fabricating the flow meter body by a separate member, thereby reducing the number of parts of the system. Furthermore, the standardized module can be applied even if the setting position of the main passage or the size thereof is changed.

For the purpose of the reduction in size and weight, a member forming the auxiliary passage can be made small in size and light in weight with no damage of the function of the auxiliary passage not only by reducing the length of the auxiliary passage in a main flow direction in such a manner that the form of the auxiliary passage is simplified, the total path length is maintained by providing a bent passage, a temperature sensing resistor is arranged in an orthogonally bent portion of the auxiliary passage and the profile of a cross section of a second path of the auxiliary passage perpendicular to the main flow direction has a form in which a length in a direction perpendicular to the main flow direction is large as compared with that in the main direction but also by suppressing the length of the second path of the auxiliary passage perpendicular to the main flow direction. On the other hand, the main passage can be made small in size and light in weight by providing a construction which gets off with no enlargement of the cross section of the main passage by reducing the occupying proportion of the auxiliary passage forming member in the main passage and configuring the auxiliary passage so that it is hard to generate a pressure loss. Also, an insertion hole provided in the wall surface of the main passage for inserting the auxiliary passage can be formed with a small-diameter circle by selecting the ratio of the length of the auxiliary passage forming member to the width thereof so that it is not large. As a result, the formation of the insertion hole is facilitated, thereby making it possible to cope with the miniaturization of the circuit.

Measures to counter the change of environment include a measure to counter the change of the flow of a air in the main passage depending on the position of the intake system and a measure to counter a change in temperature depending on the position of the air flow measuring instrument at which it is placed. To cope with a measurement error caused by the generation of a pulsatio flow in the main passage, the auxiliary passage is configured into an L-shaped bent passage and the ratio of the length of a first path of the auxiliary passage parallel to the main flow direction to that of a second path thereof perpendicular to the main flow direction is optimized. To cope with the generation of a reverse flow, an opened outlet surface of the auxiliary passage is formed in a plane parallel to the main flow direction and a penthouse-like projection is provided on the upstream side of an outlet portion. To cope with a measurement error caused by a deflecting flow in the main passage, an opened inlet surface of the auxiliary passage is configured into a pan-like form, an inclined surface is provided on the upstream side of the outlet and the arrangement of the inlet and outlet of the auxiliary passage in the main passage is optimized. To cope with a turbulent flow and a whirling flow in the main passage, the total length of the auxiliary passage is made sufficiently large, the cross section of the second path is made larger than that of the first path and an inclined surface having walls on opposite sides is provided on the upstream side of the outlet. To cope with a change in temperature, a member forming the auxiliary passage is not in direct contact with a member forming the main passage, thereby reducing the conduction of a heat from the main passage forming member to the auxiliary passage forming member and suppressing the increase of the temperature of the auxiliary passage forming member caused by a heat from the main passage forming member which is liable to be heated by an engine, an exhaust pipe and so forth. Further, a temperature sensing resistor for measuring the temperature of an intake air is fixed near to the inner corner of an orthogonally bent portion of the auxiliary passage at a position distanced from a base member and a heating resistor is fixed at a position nearer to the base member than the temperature sensing resistor. To prevent the deterioration of the accuracy of measurement depending on the fixing position of the heating resistor, the distance of the heating resistor from the pan-like bottom surface of the opened inlet portion of the auxiliary passage is optimized.

To cope with the variations of mounting of the module to the main passage, the outer profile of a cross section of the auxiliary passage portion of the auxiliary passage forming member parallel to the base member has a form such as a rectangle, a trapezoid or the like with which a plane perpendicular to the main flow direction and including the opened inlet surface of the auxiliary passage and a plane parallel to the main flow direction can be provided, the opened outlet surface of the auxiliary passage is formed in the plane parallel to the main flow direction and the opened inlet surface is configured into a pan-like form dug in the outlet direction.

For the purpose of the improvement of the handing operability, the circuit portion and the auxiliary passage portion are united in a module, the insertion hole of the main passage has a size capable of being covered with the base member, thereby making it possible to prevent the leakage of an air from the insertion hole by an O ring, a packing, a gasket or the like, and a groove for mounting an O ring is formed to attain a modular structure with O ring, and the module is detachably fixed to the main passage.

By uniting the circuit portion and the auxiliary passage portion in a module and making the module have the most of the function of the thermal type air flow measuring instrument, it becomes possible to handle the module as one product. Thereby, an enterprise assorting internal combustion engines, for example, an automobile maker can obtain a low-cost thermal type air flow measuring instrument and the free layout of the intake system becomes possible.

Since the module protects an electronic circuit by a circuit housing and a cover and protects the heating resistor and the temperature sensing resistor by the auxiliary passage forming member, a trouble caused from the handling is prevented. Also, since the auxiliary passage forming member is not in direct contact with the main passage forming member, a heat generated from the main passage forming member is hard to conduct to the auxiliary passage, thereby reducing the deterioration of the accuracy of measurement caused by a change in temperature of the auxiliary passage.

With the construction in which the auxiliary passage is configured into the L-shaped bent passage, the total length of the auxiliary passage can be made sufficiently large, thereby reducing the influence of the disturbance of an air flow of the main passage at the outlet portion of the auxiliary passage on an air flow in the vicinity of the heating resistor. With the construction in which the inclined surface having walls on opposite sides is provided on the upstream side of the outlet of the auxiliary passage, the flow of the main passage at the outlet portion of the auxiliary passage is turned to a stabilized flow having a strong force of inertia and a regulated directivity, thereby reducing the disturbance of the flow of the main passage itself. The opened inlet surface of the auxiliary passage is provided in a plane perpendicular to the flow direction of the main passage and the opened outlet surface thereof is provided in a plane parallel to the main flow direction, in order that a dynamic pressure is received by the inlet and the outlet is subjected to suction by a static pressure. Thereby, a difference in pressure between the inlet and the outlet is increased so that the flow rate of an air flown in the auxiliary passage is increased to stabilize the flow in the auxiliary passage. The cross section of the second path of the auxiliary passage is configured to have a large width in order that a compensation is made for the decrease of the flow area of the second path resulting from the exfoliation of the flow caused by bending the auxiliary passage orthogonally with the cross section ensured while shortening the length of the auxiliary passage forming member in the main flow direction.

Thereby, the decrease of the flow rate of the air flown in the auxiliary passage is prevented to stabilize the flow in the vicinity of the heating resistor. By thus stabilizing the flow in the auxiliary passage, particularly, in the vicinity of the heating resistor, there is provided an effect that the output noise of the air flow measuring instrument is reduced to improve the accuracy of measurement. Also, the L-shaped auxiliary passage provides an effect that a minus error caused by the non-linearity of the radiating characteristic of the heating resistor and a response delay thereof, when a pulsation flow is generated in the main passage, is cancelled in such a manner that an output at the time of generation of the pulsation flow is changed in a plus or positive direction by making the length of the auxiliary passage larger than the relative length of the main passage between the inlet and the outlet of the auxiliary passage to provide an inertia effect to the flow of the auxiliary passage, thereby reducing an output error caused by the pulsation flow. The reason why the length of the second path of the auxiliary passage is two times as large as the length of the first path thereof, is that when the length ratio is 2, the degree of the inertia effect in the L-shaped auxiliary passage is optimized to cancel the above-mentioned minus error. Further, since there is used an open-sided or overhung structure in which the opened outlet surface of the auxiliary passage is provided in a plane parallel to the base member and the auxiliary passage forming member is fixed on the circuit side, the auxiliary passage is fixed to the main passage by fixing the circuit portion to the wall surface of the main passage. With the open-sided structure, even in the case where the size of the main passage is different, the standardized module is applicable with no change in position of the center of the main passage and the inlet and outlet of the auxiliary passage by making an interval between the center of the main passage and the circuit portion mounting surface constant.

The reason why the heating resistor is arranged in the first path and the temperature sensing resistor is arranged in the orthogonally bent portion, is that it becomes possible to suppress the length of the first path. With such a construction, there is prevented a thermal flow interference which may result from the proximate arrangement of the heating resistor and the temperature sensing resistor. A measurement error is reduced by arranging the heating resistor in the first path in which the stabilization of the flow is easy. When the length of the auxiliary passage forming member parallel to the main flow can be made small by making the length of the first path small, it is possible to make the length of the auxiliary passage forming member parallel to the main flow within two times as large as the width of the auxiliary passage forming member even if the width is small to an extent in which the increase of a pressure loss of the flow meter provides no problem. Accordingly, the insertion hole provided in the wall surface of the main passage for inserting the auxiliary passage can be formed with a circle having a relatively small diameter. Therefore, the formation of the insertion hole is facilitated, thereby making it possible to prevent the complication of the formation of the main passage and the increase in size. Also, since the insertion hole can be formed with a size capable of being covered with the base member, a room for the further miniaturization of the circuit portion can be ensured and the leakage of an air inside and outside of the main passage from the insertion hole portion can be prevented by sealing a space between the bottom surface of the base member and the circuit portion fixing surface of the outer wall of the main passage by an O ring, a packing, a gasket or the like, thereby making it possible to prevent a measurement error caused by the air leakage. Further, since the insertion hole has a circular form, an inter-diameter sealing by an O ring is possible.

A method including fixing terminals in reference to the base member so that they are held by a holder and pass through the base member, fixing the electronic circuit and the circuit housing onto the upper surface of the base member, covering the upper surface of the circuit housing with a cover, fixing the heating resistor and the temperature sensing resistor to the terminals or the holder on the lower surface side of the base member, inserting the holder and the terminals into a hole provided in the auxiliary passage forming member and fixing the auxiliary passage forming member to the holder or the base member so that the heating resistor and the temperature sensing resistor are positioned in the auxiliary passage, is easy in fabrication, thereby attaining the reduction of the production cost. Further, since the unification of the base member and the circuit housing, the base member and the holder, and so forth is possible, it is possible to reduce the number of parts, thereby attaining the further reduction of the cost. Also, each part has a structure in which it can be fixed without requiring an additional part for fixing such as insert molding, adhesion, welding or the like. Further, a groove can be formed on a joining surface of the auxiliary passage forming member and the holder or the base member. If an O ring is beforehand mounted to that groove, there is obtained a module which has the O ring united thereto with no fear of falling-off or has an improved handling operability.

With the construction in which the outer profile of a cross section of the auxiliary passage portion of the auxiliary passage forming member parallel to the base member takes a form such as a rectangle, a trapezoid or the like which has a plane perpendicular to the main flow direction and including the opened inlet surface of the auxiliary passage and a plane parallel to the main flow direction, it is possible to reduce a measurement error caused by the variations of the mounting angle of the module for the direction of rotation of the module when the module is mounted to the main passage. If the mounting angle of the module is incorrect for the flow direction of the main passage, the effective area of the opened inlet surface of the auxiliary passage (or the area of the opened inlet surface projected onto a cross section perpendicular to the main flow direction) is reduced so that an air flow entering the auxiliary. passage is decreased, thereby resulting in an action of generating an output error of the minus side. On the other hand, a plane of the auxiliary passage forming member parallel to the main flow, when the mounting angle of the module is incorrect, reduces the effective area of the main passage so that an air flow entering the auxiliary passage is increased, thereby resulting in an action of generating an output error of the plus side. Both the actions are cancelled, thereby making it possible to reduce the measurement error caused by the variations of the mounting angle of the module. When taking the general cross section of the main passage and the general size of the auxiliary passage forming member into consideration, the above cancellation becomes effective when the length of the plane parallel to the main flow direction in the main flow direction is about two times as large as the width of the opened inlet surface of the auxiliary passage. The reason why the outer profile of a cross section of the auxiliary passage portion of the auxiliary passage forming member parallel to the base member is configured into a trapezoidal form or a combined form of a trapezoid and a rectangle, is that a dynamic pressure generated on the upper surface of the auxiliary passage forming member is reduced with no deterioration of the above-mentioned effect of reducing the influence of the mounting angle and with no decrease of the cross section of the second path, thereby reducing a pressure loss of the air flow measuring instrument. Further, the bottom surface of the auxiliary passage forming member on the downstream side is configured into a circular arc form in order that a turbulence by an exfoliating flow on the downstream side is made small to reduce the pressure loss and in order that the cross section of the second path can be enlarged with one side configured into a circular arc form. The length of the longest diagonal of the above-mentioned outer profile of the cross section of the auxiliary passage is made substantially the same as the diameter of the circular insertion hole provided in the wall surface of the main passage in order to make the insertion hole small.

The construction in which the opened inlet surface of the auxiliary passage is configured into a pan-like form dug in the outlet direction, has a first object to take an air in the auxiliary passage from a wide portion of the main passage, thereby reducing a measurement error when a deflecting flow is generated in the main passage. This effect of reduction of the measurement error at the time of generation of the deflecting flow is also possessed by the inclined surface provided on the upstream side of the outlet of the auxiliary passage. If the flow rate on the upstream side of the outlet is increased due to the deflecting flow, an exfoliating flow area developed on the downstream side of the inclined surface is expanded so that the suction effect of the outlet of the auxiliary passage becomes large, thereby increasing an air flow entering the auxiliary passage. To the contrary, if the flow rate on the upstream side of the outlet is decreased, the exfoliating flow area of the outlet becomes small, thereby reducing an air flow entering the auxiliary passage. Therefore, if the inlet and the outlet are disposed in a positional relationship which allows the well cancellation of the degree of the influence on the air flow entering the auxiliary passage by the change of the flow rate on the upstream side of the opened inlet surface of the auxiliary passage, it is possible to reduce the measurement error caused by the deflecting flow. This action becomes the most effective in the case where the first path is provided at a position which is eccentric to the center of the main passage, the pan-like portion is expanded in a region including the vicinity of the center of the main passage and the outlet of the auxiliary passage is provided at a portion opposite to the inlet thereof with respect to the center of the main passage. Also, the pan-like opened inlet portion has an effect of reducing a measurement error which is caused by the variations of inclination of the auxiliary passage forming member in the upstream and downstream directions resulting from the inclination of the circuit fixing surface or the insertion hole in the wall surface of the main passage. If the outlet direction of the auxiliary passage is inclined to the upstream direction of the main passage, the opened outlet surface is inclined in a direction in which it can be seen from the upstream side of the main passage. Therefore, a some static pressure is generated at the opened outlet surface or a negative pressure is reduced. Accordingly, a difference in pressure between the inlet and the outlet of the auxiliary passage becomes small so that an air flow entering the auxiliary passage is reduced, thereby resulting in an action of generating a measurement error of the minus side. On the other hand, the pan-like opened surface further facilitates the introduction of an air flow in the vicinity of the center of the main passage into the auxiliary passage because of the inclination of the first path to the downstream side and an exfoliating flow area developed in the first path becomes large so that the flow rate in the vicinity of the heating resistor is increased, thereby resulting in an action of generating an output error of the plus side. Both the actions are cancelled, thereby making it possible to reduce the measurement error caused by the variations of inclination of the auxiliary passage forming member. To the contrary, if the outlet is inclined to the downstream side, a negative pressure at the outlet portion is increased. On the other hand, the inlet portion is inclined to a direction in which it is hard to take an air in the auxiliary passage. Also, an exfoliating flow area in the first path is reduced. As a result, these actions of the inlet and the outlet are cancelled, thereby making it possible to reduce the measurement error.

The temperature sensing resistor is fixed at a position farther from the base member than the center line of the first path in order to position the temperature sensing resistor near to the inner corner of the orthogonally bent portion having the higher flow rate in the orthogonally bent portion, thereby improving the accuracy of detection of the temperature of an intake air and in order to provide an action of reducing an intake air temperature detection error in which the temperature of the temperature sensing resistor becomes higher than the temperature of the intake air due to a thermal conduction through the terminals or the holder under a temperature environment in which a difference is generated between the temperature of the intake air and the ambient temperature of the air flow measuring instrument, for example, due to a heat conducted through the holder or the terminals from the surrounding when the ambient temperature is higher. In the case where the temperature sensing resistor erroneously measures a temperature higher than the temperature of the intake air, a flow measurement error of the plus side is generated. On the other hand, the heating resistor under the environment having the higher ambient temperature makes an action of generating a flow measurement error of the minus side since the amount of heat dissipated due to a thermal conduction to the terminals and the holder is reduced. Accordingly, if the degrees of influences on both the resistors are made equal to each other, it is possible to reduce a measurement error under the environment in which the intake air temperature and the ambient temperature are different. In actual, since the degree of influence of thermal conduction and the degree of influence of heat transfer to the air are different depending on a difference in temperature between the heating resistor and the temperature sensing resistor, there does not suffice a simple method in which the thermal resistance of the terminal and the holder of the heating resistor is made equal to the thermal resistance of the terminal and the holder of the temperature sensing resistor. It is preferable that the thermal resistance of the temperature sensing resistor side is made large and the thermal resistance of the heating resistor side is made smaller than the thermal resistance on the temperature sensing resistor. By fixing the temperature sensing resistor at a position far from the base member and fixing the heating resistor nearer to the base member than the temperature sensing resistor, it is possible to easily obtain a proper thermal balance between both the resistors for reducing the measurement error under the above-mentioned temperature environment.

Regarding the position of the heating resistor to be arranged in the first path, it is required that the heating resistor should be arranged in the main flow of the first path, that is, in a flow having a higher and stabilized flow rate. Accordingly, even in the case of the arrangement of the heating resistor considering the above-mentioned temperature environment, not only the positional relationship with the temperature sensing resistor but also the position of the heating resistor in the first path must be taken into consideration. In the case of a simple circular pipe path, the main flow is positioned in the vicinity of the center of the path. However, a factor of determining the position of the main flow in the first path in the case of the auxiliary passage including the pan-like opened inlet surface and the orthogonally bent portion includes an action of moving the main flow from the center of the pipe path in a direction in which it gets near to the base member due to an exfoliating flow generated by a first corner formed by the bottom surface of the pan-like opened inlet surface and the first path and an action of moving the main flow from the center of the pipe path in a direction in which it gets away from the base member due to the increase of a flow rate of the vicinity of the inner corner (or a second corner) at the orthogonally bent portion. Namely, a positional relationship between the first corner and the second corner influences the position of the main flow in the first path. If a distance between the heating member and that inner wall of the first path farthest from the base member which is a wall surface connecting the first and second corners is selected to be a proper value, it is possible to arrange the heating resistor in the main flow of the first path. In the general size of the auxiliary passage, a portion distanced from the inner wall of the first path farthest from the base member by one half of the interval between the first corner and the second corner to the same as that is an area of the main flow of the first path.

The provision of the profile of the cross section of the first path with a combined form of a semicircle and a rectangle is one means for arranging the heating resistor in the main flow of the first path while optimizing the positional relationship between the heating resistor and the temperature sensing temperature. Namely, the profile is configured into a form with which the position of the heating resistor is optimized from the relationship with the temperature sensing resistor and the position of the inner wall of the first path having the first and second corners and farthest from the base member can be set freely in order to move the position of the main flow of the first path to the vicinity of the heating resistor.

As mentioned above, the construction of the auxiliary passage of the present invention has many functions concerning the change of environment, the variations of mounting and the mountability. The auxiliary passage forming member has no need to combine a plurality of parts and maintains a simple form which can be formed as one plastic-molded product. Accordingly, it is possible to suppress the cost of the module itself to a low value. Also, since the form of the main passage can be simplified, the module has a function and a structure with which it can be handled as one product and the module can cope with the change of environment and the variations of mounting, it becomes possible to unit the main passage to other parts of the intake system. Further, since the standardization of the module is also possible, the reduction of the system cost of the internal combustion engine can be attained. Further, since the module can be fixed to the main passage by merely mounting the circuit portion to the outer wall of the main passage, the mountability is good and the detachable fixation to the main passage is easy. With the detachable fixation, it is possible to cope with troubles in a market by the exchange of only the module portion.

DESCRIPTION OF THE PREFERRED EMBODIMENTS

Embodiments of the present invention will now be explained in reference to FIGS. 1 to 14.

Figure 1:
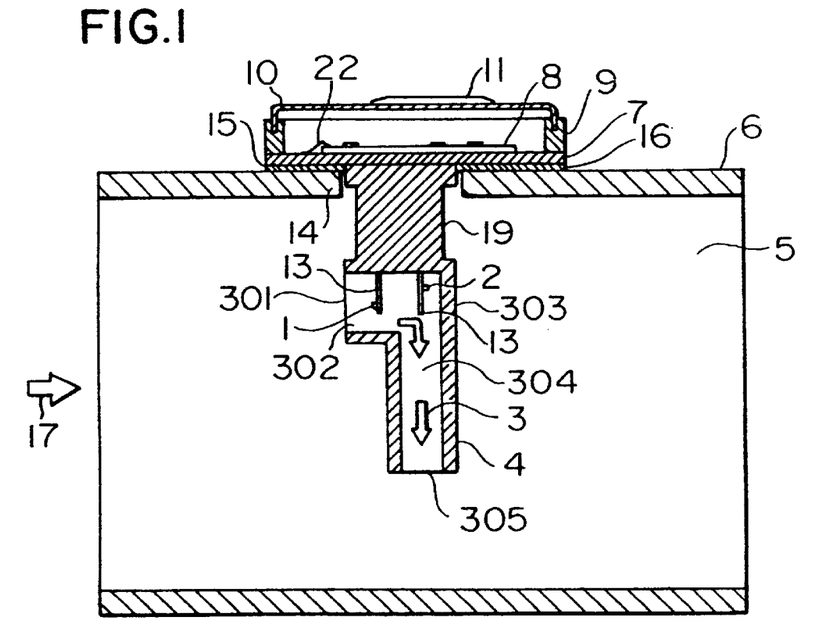
FIG. 1 is a longitudinal cross section of a thermal type air flow measuring instrument according to an embodiment of the present invention.
Figure 2:
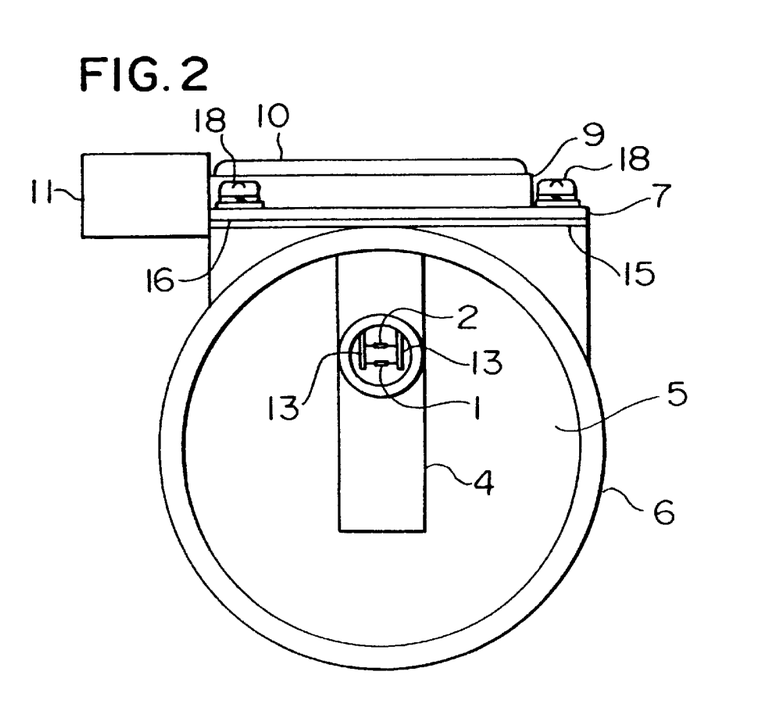
FIG. 2 is a front view of the measuring instrument of FIG. 1 seen from the upstream side of the flow of an air.

FIG. 1 is a longitudinal cross section of an embodiment of the present invention, and FIG. 2 is a sketch view of the present embodiment seen from the upstream side (or the left side of FIG. 1).

An electronic circuit 8 and a circuit housing connector 11 for electrical connection to an external instrument is united to the circuit housing 9. An upper surface of the circuit housing 9 is covered with a cover 10. Terminals 13 electrically connected to the electronic circuit 8 are drawn out toward the lower surface direction of the base member 7. A heating resistor 1 and a temperature sensing resistor 2 are fixed to the terminals 13 in electrical connection therewith. An auxiliary passage 3 is an L-shaped flow passage which includes an opened inlet surface 301 provided in a plane perpendicular to the base member 7, a first path 302 extending from the opened inlet surface 301 in a direction parallel to the base member 7, a second path 304 extending in a direction perpendicular to the base member 7 and having a length about two times as large as the first path 302, an opened outlet surface 305 provided in a plane parallel to the base member 7, and an orthogonally bent portion 303 corresponding to the intersection of the first path 302 and the second path 304. An auxiliary passage forming member 4 is fixed to the base member 7 so that the heating resistor 1 and the temperature sensing resistor 2 are positioned in the first path 302 and the orthogonally bent portion 303, respectively. The above construction provides a module in which the circuit portion and the auxiliary passage portion of a thermal type air flow measuring are united.

Figure 3:
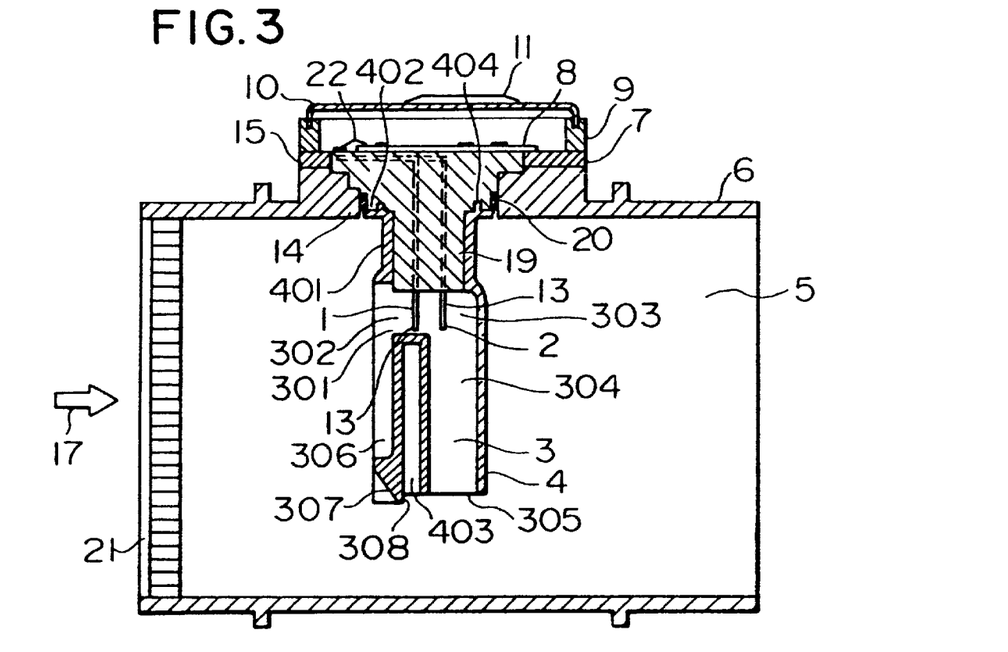
FIG. 3 is a longitudinal cross section of a thermal type air flow measuring instrument according to another embodiment of the present intention aimed at the improvement of the accuracy of measurement.
Figure 4:
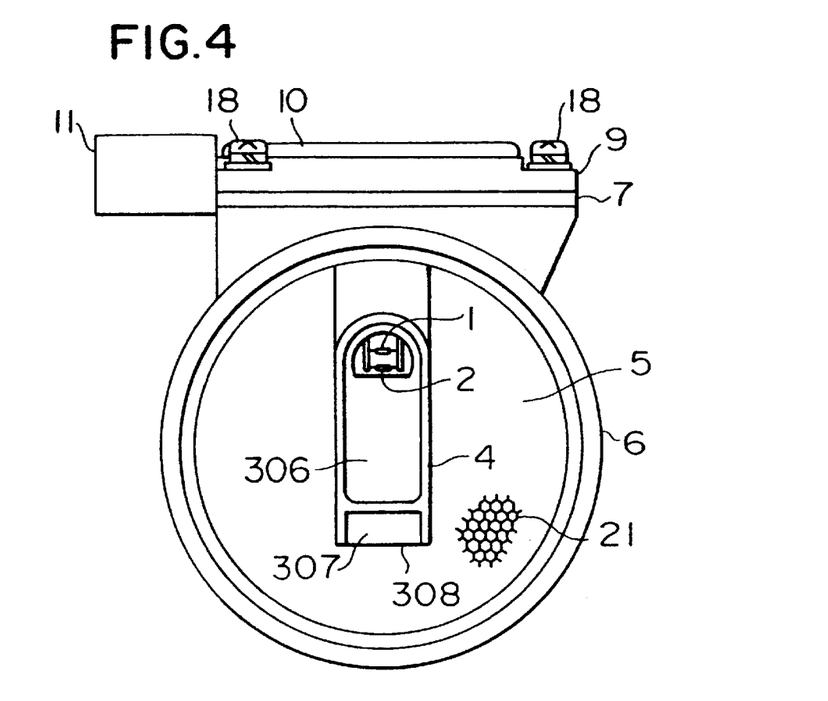
FIG. 4 is a front view of the measuring instrument of FIG. 3 seen from the upstream side of the flow of an air.

On the other hand, the wall surface of a flow meter body 6 forming a main passage 5 is provided with an insertion hole 14 for inserting the auxiliary passage forming member 4 and a mounting and fixing surface 15 for mounting the base member 7. The auxiliary passage forming member 4 is inserted from the insertion hole 14 into the flow meter body 6 so that the first path 302 of the auxiliary passage 3 is parallel to the flow direction 17 of the main passage 5, and the base member 7 is fixed to the outer wall of the main passage by screws 18 with a rubber packing 16 interposed between the mounting and fixing surface 15 and the lower or bottom surface of the base member 7 so that the surrounding of the insertion hole 14 is sealed FIG. 3 shows a longitudinal cross section of another embodiment which a construction for reducing the deterioration of the accuracy of measurement under various environments and a method of fixing the auxiliary passage forming member and the base member are realized. FIG. 4 shows a sketch view of the embodiment of FIG. 3 seen from the upstream side (or the left side) thereof.

Terminals 13 are united to a holder 19 so that the terminals 13 pass through the holder 19, and a base member 7 and the holder 19 are fixed through a hole portion of the base member 7. Various methods of fixing the terminals 13, the holder 19 and the base member 7 include a method in which when the terminals 13 and the base member 7 are metallic and the holder 19 is plastic, the terminals 13 and the base member 7 are insert-molded at the time of molding of the holder 19 so that the holder 19, the terminals 13 and the base member 7 are united, a method in which the terminals 13 and the holder 19 are insert-molded and are then fixed to the base member 7 by adhesion or the like, a method in which the terminals 13 are insert-molded to the base member 7 and the holder 19 formed as one plastic-molded product though they are shown as separate members in FIG. 3, and a method in which the terminals 13 are insert-molded to the circuit housing 9, the base member 7 and the holder 19 formed as one plastic-molded product in order to reduce the number of parts to the minimum. An electronic circuit 8 is fixed to an upper surface of the base member 7 or the holder 19 and is electrically connected to the terminals through conductive members 22 such as wires. Also, a circuit housing 9 is fixed to the upper surface of the base member 7 and an upper surface of the circuit housing 9 is covered by fixing a cover 10.

On the other hand, a heating resistor 1 and a temperature sensing resistor 2 are electrically connected and fixed to end portions of the terminals 13 opposite to the electronic circuit 8. In the present embodiment, the temperature sensing resistor 2 is fixed so that it is positioned in an orthogonally bent portion 303 of an auxiliary passage 3 and near to its inner corner and the heating resistor 1 is fixed so that it is positioned in a first path 302 of the auxiliary passage 3 and nearer to the base member 7 than the temperature sensing resistor 2, thereby providing a construction in which a measurement error can be reduced even in an environment involving a large change in temperature.

An auxiliary passage forming member 4 includes an L-shaped passage having an opened inlet surface 301, the first path 302, the orthogonally bent portion 303, a second path 304 and an opened outlet surface 305 as in the embodiment shown in FIGS. 1 and 2, and further includes a pan-like inlet 306 which is provided for introducing an air to be taken in the auxiliary passage 3 in a wide range or more particularly from the vicinity of the center of a main passage 5 and is dug leaving a surrounding wall, an inclined surface 307 and a penthouse-like outlet projection 308 which are provided for stabilizing an air flow at an outlet portion of the auxiliary passage 3, the inclined surface having walls on opposite sides and the outlet projection 308 extending so that one end of the inclined surface 307 is projected downward from the opened outlet surface 305, and a joining surface 402 which joins the holder 19 and a hole 401 for inserting the holder 19. In order to make the fixing position of the heating resistor 1 nearer to the base member 7 than the center of the first path 302 of the auxiliary passage 3 with a preference to the influence of temperature so that the fixing portion of the heating resistor 1 is positioned in an area which is in a cross section perpendicular to the flow of the first path 302 and where the flow rate is relatively high and the flow is stable, the cross section of the first path of the auxiliary passage 3 is configured to have a combined form of a semicircle and a rectangle. An interval between the heating resistor 1 and the inner wall of the first path 302 connecting a corner formed by the bottom surface of the pan-like inlet 306 and the first path 302 and the inner corner of the orthogonally bent portion 302 is one half of an interval between both the corners to the same as that. Further, a hollow space 403 for eliminated material parallel to the second path 304 is provided to make the thickness of the auxiliary passage forming member 4 uniform, thereby preventing a change in shape caused by the distortion of plastic molding and reducing the material cost and the weight.

The auxiliary passage forming member 4 is fixed in such a manner that the holder 19 is inserted into the holder inserting hole 401 and the member 4 is adhered to the holder at the joining surface 402. A groove portion 404 is formed by a stepped portion provided in the holder 19 and the joining surface 402 of the auxiliary passage forming member. This groove portion 404 is a groove for mounting an O ring 20. Thus, there is provided a construction in which an insertion hole 14 of the wall surface of the main passage is sealed by the O ring 20. With the above construction, there is provided a module in which the circuit portion, the auxiliary passage portion and the O ring for insertion hole sealing are united.

A thermal type air flow measuring instrument is completed by fixing the above module to a flow meter body 6 as in the embodiment shown in FIG. 1. In the present embodiment, no rubber packing is required since the O ring is mounted in the module. In the present embodiment, there are shown a construction in which the circuit housing 9 is fixed by screws 18 together with the base member 7 to increase the fixing intensity of the circuit housing and a construction in which a flow straightening grid 21 is mounted in the inlet surface of the main passage 5 of the flow meter body 6 to improve the accuracy of measurement.

Figure 5:
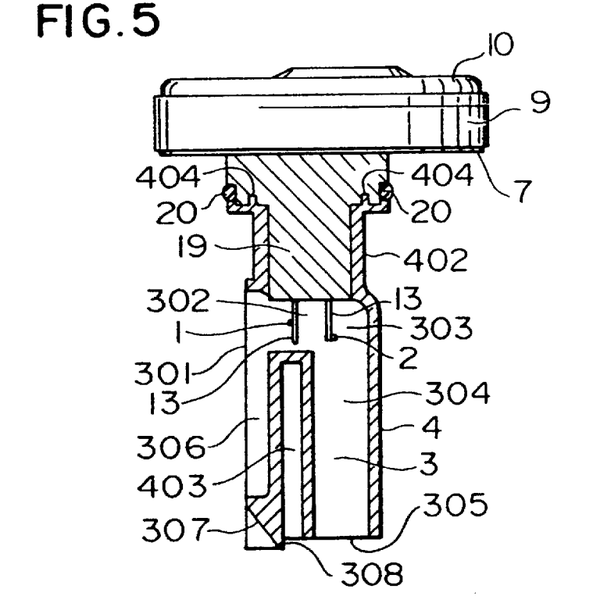
FIG. 5 is a longitudinal cross section of showing a module of FIG. 3 as a single member.
Figure 6:
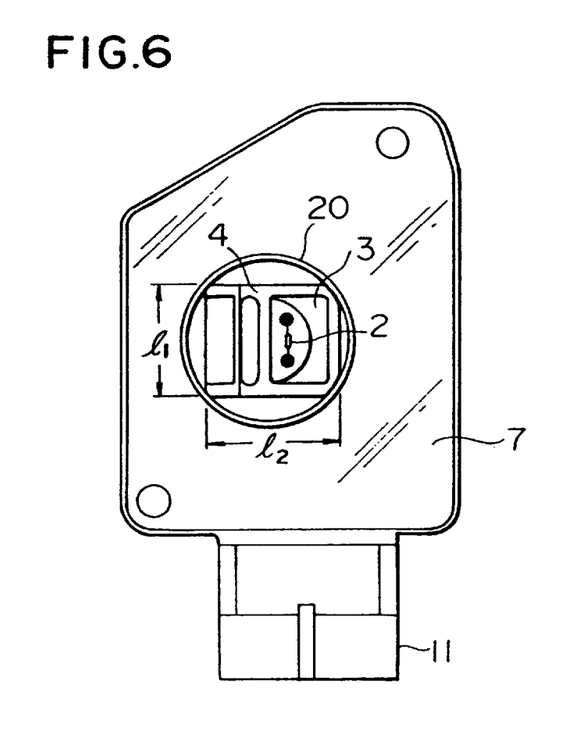
FIG. 6 is a bottom view of the measuring instrument of FIG. 5 seen from the outlet direction of an auxiliary passage.

FIG. 5 is a longitudinal cross section of a module in which the circuit portion and the auxiliary passage portion of the embodiment shown in FIGS. 3 and 4 are united, and FIG. 6 is a sketch view of the module seen from the down side (or the outlet direction) of FIG. 5.

The outer profile of a cross section of the auxiliary passage forming member 4 parallel to the base member 7 has a circular form at a portion where the holder 19 is inserted and a rectangular form at the auxiliary passage portion. The rectangular form is such that the length $l_2$ of a side parallel to the flow direction of the first path is one to two times as large as the length $l_1$ of a side perpendicular to the flow direction of the first path. Also, the outer profile of a portion of the holder 19 inserted into the insertion hole 14 of the wall surface of the main passage has a circular form and the diameter of the circular form is substantially equal to the length of a diagonal of the rectangular cross section of the auxiliary passage portion. Therefore, the insert hole provided in the wall surface of the main passage can be configured into a relatively small circle. Further, the opening width of the opened inlet surface 301 of the auxiliary passage perpendicular to the flow direction of the second path 304 is about one half of the length of the above-mentioned side of the rectangular cross section of the auxiliary passage portion parallel to the first path 302, and the outer profile of the cross section of the second path 304 is a rectangle in which a side perpendicular to the first path 302 is longer than a side parallel to the first path 302.

Figure 7:
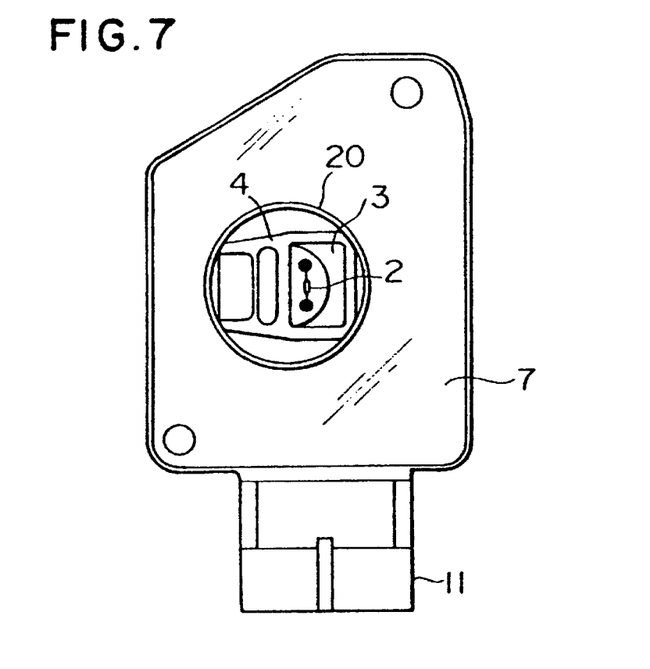
FIG. 7 is a bottom view showing a further embodiment in which the configuration of the upstream side of the auxiliary passage shown in FIG. 5 is modified.
Figure 8:
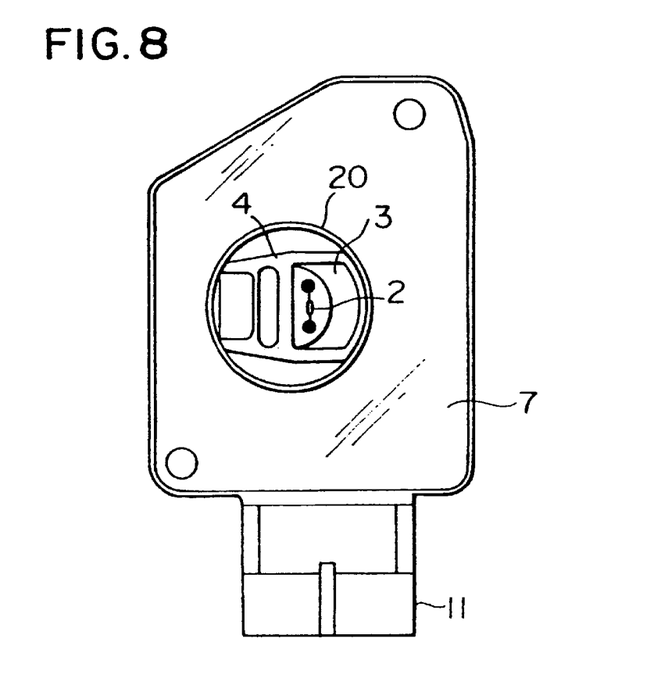
FIG. 8 is a bottom view showing a still further embodiment in which the configuration of the upstream side of the auxiliary passage shown in FIG. 5 is modified.

FIGS. 7 and 8 similar to that of FIG. 6 are sketch views of further embodiments as seen from the down side of FIG. 5. In the embodiment shown in FIG. 7, the outer profile of that cross section of a portion of the holder 19 inserted into the insertion hole 14 of the wall surface of the main passage which is parallel to the base member 7 takes a circular form having the same diameter as that in the embodiment shown in FIG. 6 and the form of the second path 304 of the auxiliary passage is the same as that in the embodiment shown in FIG. 6 but the outer profile of a cross section of the auxiliary passage forming member 4 parallel to the base member 7 of the auxiliary passage has a combined form of a trapezoid and a rectangle. In the embodiment shown in FIG. 8, each of the bottom surface of the second path on the downstream side thereof and the bottom surface of the outer profile of a cross section of the auxiliary passage portion on the downstream side thereof takes a circular arc form.

Figure 9:
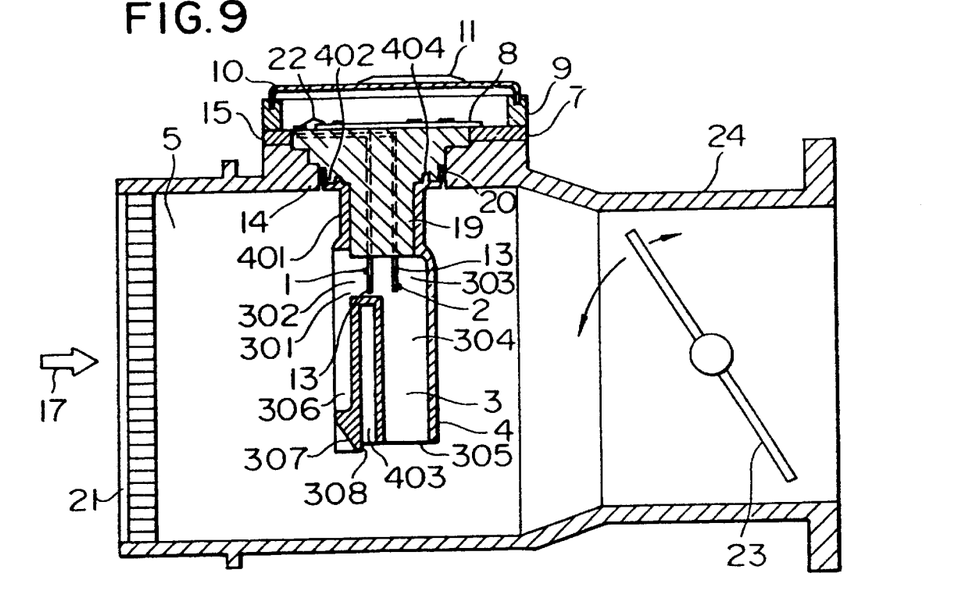
FIG. 9 is a longitudinal cross section of a thermal type air flow measuring instrument which is united to a throttle body as an embodiment of the present invention.

FIG. 9 shows an embodiment of a thermal type air flow measuring instrument in which the module shown in FIG. 5 is inserted in a throttle body 24 having a valve 23 for controlling the amount of an intake air of an engine. A flow measuring section is disposed on the upstream side of the valve 23. In FIG. 9, the air flow is directed from the left to the right. Though a thermal type air flow measuring instrument with auxiliary passage united to a throttle body has existed as a manufactured product, the structure of the throttle body is considerably complicated since the auxiliary passage member is united to the throttle body or a housing member covering the circuit of the module is united to the throttle body. To the contrary, in the present embodiment, the housing member and the auxiliary passage member are united to the module. Therefore, the present embodiment makes it possible to simplify the structure of the throttle body. Also, in the case of an intake system having no throttle valve (for example, diesel engine automobile), it is possible to mount the module directly to an intake manifold.

Figure 10:
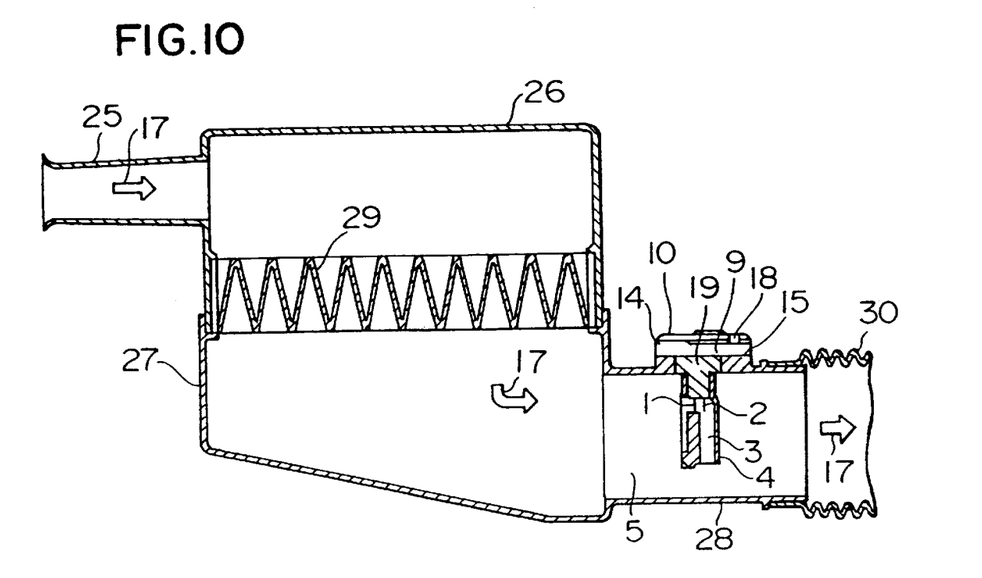
FIG. 10 is a longitudinal cross section of a thermal type air flow measuring instrument which is united to an air cleaner as an embodiment of the present invention.

FIG. 10 shows an embodiment of a thermal type air flow measuring instrument in which the module shown in FIG. 5 is mounted to a part of an air cleaner disposed in an engine room. The air cleaner has a structure in which a filter member 29 for eliminating the dust in an air is fixed in a form sandwiched between an upstream side case member 26 which has an introducing duct 25 for taking in a new air and a down stream case member 27 which has a duct 28 for connecting an intake duct 30 and the air cleaner. It is of course that the air flows as indicated by arrows in FIG. 10 and a clean air resulting from the elimination of the dust by the filter 29 flows through the duct 28. An insertion hole 14 for inserting the auxiliary passage portion of the thermal type air flow measuring instrument is provided in a part of the duct 28 so that the duct 28 and the module are mechanically fixed by use of screws or the like. Thereby, it becomes possible to construct a main passage by using a part of the air cleaner such as the duct 28 in lieu of the main passage forming body in the foregoing embodiments or provide a low-cost thermal type air flow measuring instrument in a single form of the module which does not require the body.

Figure 11:
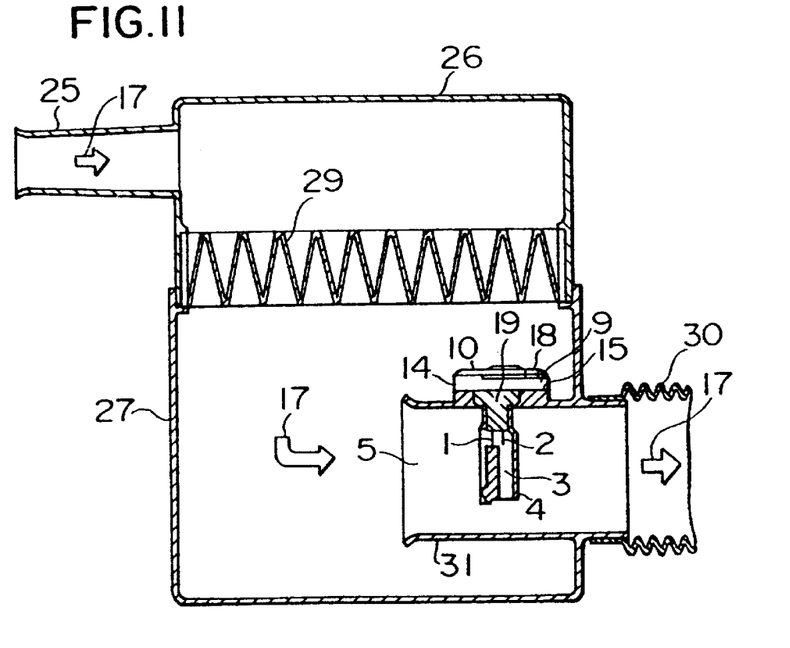
FIG. 11 is a longitudinal cross section of a thermal type air flow measuring instrument which is incorporated in an air cleaner as an embodiment of the present invention.

FIG. 11 shows another embodiment of a thermal type air flow measuring instrument in which the module shown in FIG. 5 is mounted to a part of an air cleaner as in the embodiment shown in FIG. 10. In the embodiment shown in FIG. 10, the module portion of the thermal type air flow measuring instrument is mounted to a part of the duct 28 provided outside of the downstream side case member 27. On the other hand, in the embodiment shown in FIG. 11, the module is mounted with a construction in which a duct 31 is provided inside of a downstream side case member 27 and an insertion hole 14 is provided in a part of the duct 31. In FIG. 11, one end of the duct 31 is configured into a bell-mouth form in order to straighten the flow of an air. With the construction of the present embodiment in which the module of the thermal type air flow measuring instrument is inserted in the air cleaner, it is possible to shorten the length by a portion corresponding to the duct 28 shown in FIG. 10 and it is therefore possible to make the intake system compact. Though each of the duct 28 shown in FIG. 10 and the duct 31 shown in FIG. 31 is unitary with the downstream side case member 27 of the air cleaner, the duct and the case member may fabricated as discrete members which are thereafter fixed to maintain a mechanical intensity.

Figure 12:
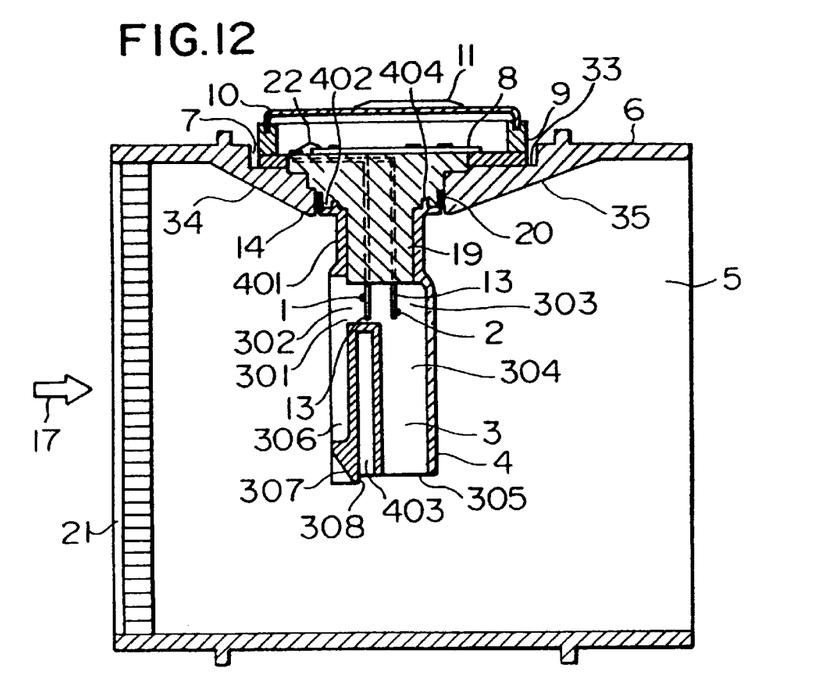
FIG. 12 is a longitudinal cross section of a thermal type air flow measuring instrument in the case where the inner diameter of the body of a main passage is increased as an embodiment of the present invention.
Figure 13:
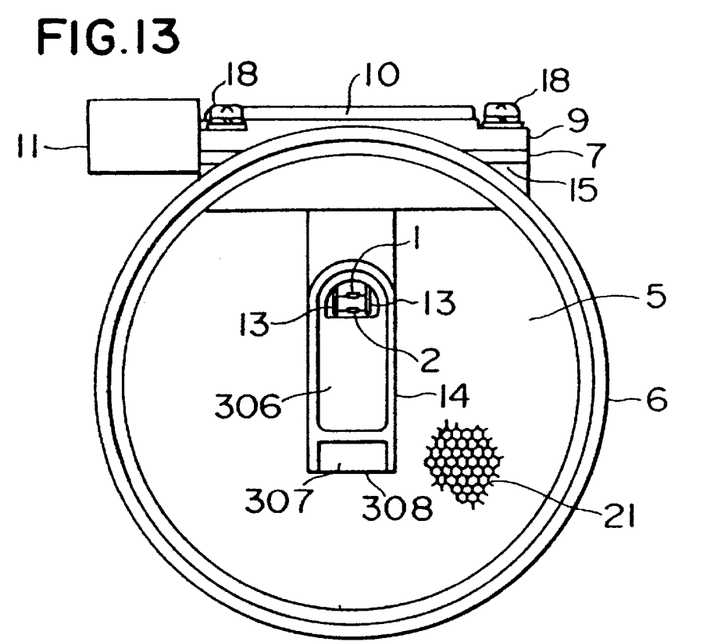
FIG. 13 is a front view of the measuring instrument of FIG. 12 seen from the upstream side of the flow of an air.

FIG. 12 is a longitudinal cross section of a thermal type air flow measuring instrument according to another embodiment of the present invention, and FIG. 13 is a sketch view of the instrument seen from the upstream side (or left side) of FIG. 12. The present embodiment shown in FIGS. 12 and 13 is different from the embodiment shown in FIGS. 3 and 4 in that the inner diameter of a body 6 forming a main passage is increased. When the inner diameter of the body is increased, it may simply be considered that a first path 302 and an opened inlet surface 301 of an auxiliary passage including a heating resistor 1 arranged therein for measuring a flow rate are placed aside or near to the wall surface of the body 6. In this case, if a deflecting flow is generated in the air flow in the body 6 due to the form of the body 6 on the upstream side thereof (or the form of an air cleaner or duct), a measurement error of the thermal type air flow measuring instrument may be generated at a place near to the wall surface of the body 6 due to the deflecting flow. Since a general flow rate profile in a pipe exhibits a profile close to a parabola such that the flow rate is the highest at a center portion of the pipe and becomes lower as there gets near to the wall surface, that is, since the flow rate at the center of the pipe is higher than an average flow rate and that at the wall surface thereof is lower than the average flow rate, it is desirable to measure the average value of flow rate at a position shifted from the center of the pipe. Therefore, in the thermal type air flow measuring instrument according to the present invention, the inlet and the outlet of the auxiliary passage are shifted from the center of the pipe to take the average value of flow rate in the auxiliary passage. (Since a difference in pressure between the inlet and the outlet of the auxiliary passage determines the value of flow rate in the auxiliary passage, it is necessary to shift both the inlet and the outlet from the center of the pipe.) However, the most of the deflecting flow is such that the position having the highest flow rate deviates from the center position so that one exhibits the value of a higher flow rate than that at the center position and the other exhibits the value of a lower flow rate than that at the center position. Therefore, if the opened inlet surface 301 of the auxiliary passage is placed at a position having the higher flow rate profile, there is generated a measurement error of the plus side or a measurement error sided in a direction which is positive with respect to the average flow rate. On the other hand, if the surface 301 is placed at a position having the lower flow rate profile, there is generated a measurement error of the minus side or a measurement error sided in a direction which is negative with respect to the average flow rate.

In order to suppress a measurement error caused by the deflecting flow even in the case where the inner diameter of the body 6 is increased, a mounting surface 33 for mounting the base member 7 to the body 5 is dug down from the outer diameter of the body 6 and the inner wall of the body 6 has a different diameter at a module mounting portion (see FIG. 12), thereby providing a structure in which the distances to the inlet and the outlet from the center of the inner diameter of the body 6 are substantially the same. In this case, the inner wall of the body 6 is convex at the module mounting portion. Therefore, it is desired that the upstream and downstream sides of that portion are inclined as by 34 and 35 in FIG. 12 to prevent the disturbance of an air flow to the utmost.

Figure 14:
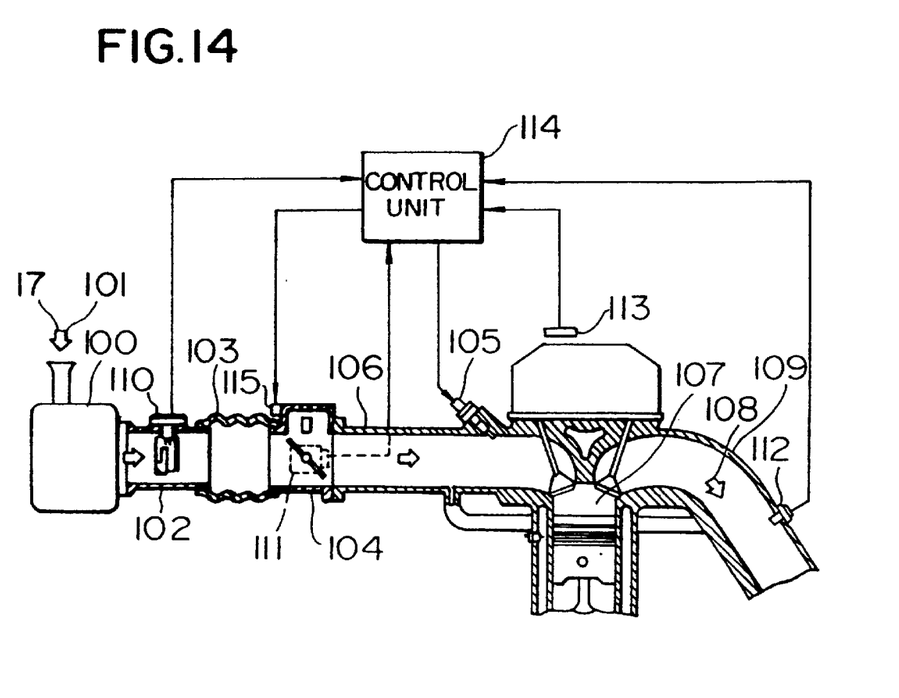
FIG. 14 is a longitudinal cross section showing the construction of a control system of an internal combustion engine in the case where a single module according to the present invention is applied to the control system of the internal combustion engine.

FIG. 14 shows an embodiment in which a thermal type air flow measuring instrument according to the present invention is applied to an electronic fuel injection type internal combustion engine.

An intake air 101 taken in an air cleaner 100 is taken in an engine cylinder 107 through a body 102 of the thermal type air flow measuring instrument, an intake duct 103, a throttle body 104 and a manifold 106 provided with an injector 105 to which a fuel is supplied. On the other hand, a gas 108 generated in the engine cylinder is exhausted through an exhaust manifold 109.

A control unit 114 inputted with an air flow rate signal outputted from a circuit module 110 of the thermal type air flow measuring instrument, a throttle valve open angle signal outputted from a throttle angle sensor 111, an oxygen concentration signal outputted from an air/fuel ratio sensor 112 provided in the exhaust manifold 109 and an engine speed signal outputted from an engine speed meter 113 operates these signals to determine the values of optimum fuel injection amount and idle air control valve open angle which are in turn supplied to the injector 105 and an idle air control valve 115 to control them.

In the present invention, a module is made have the most of a function as a thermal type air flow measuring instrument so that the module can be handled as one product, thereby making it possible to sufficiently accomplish the function as the thermal type air flow measuring instrument in such a manner that the module is mounted to, for example, a part of an air cleaner, a part of an intake duct or the like. Further, since one kind of module can be applied to various engines, the matching and so forth are facilitated, thereby making it possible to attain the reduction in system cost of an internal combustion engine.

Also, a body occupying the great portion of a cost even in the conventional thermal type air flow measuring instrument requiring a body forming a main passage can be provided with a simple cylinder form. Further, with the provision of a function as a thermal type air flow measuring instrument by one kind of module, as mentioned above, the standardization and serialization of the thermal type air flow measuring instrument corresponding to the displacement of an engine having the module mounted thereto become possible depending on only the main diameter of the body. With these effects, it becomes possible to reduce the cost by about 10% to 20% as compared with the conventional thermal type air flow measuring instrument having a body united to an auxiliary passage.

In a market, the exchange of only a single module structure suffices even in the case where any abnormality is generated in the thermal type air flow measuring instrument. Therefore, it becomes possible to improve the handling operability of the thermal type air flow measuring instrument in the market.

What is claimed is:

1. An air flow measuring apparatus, comprising:
    a housing with an electric circuit installed therein,
    a member having an auxiliary passage,
    a detecting element within said auxiliary passage,
    wherein said housing, said auxiliary passage and said detecting element are integral, and said auxiliary passage member is adapted to be inserted from a hole at an air passage wall;
    said auxiliary passage comprising,
        a first auxiliary passage including an aperture section opposite to an upstream end of said air passage, and a surface approximately perpendicular to an axial direction of said air passage downstream of said aperture section thereby guiding an air in a direction toward said hole, and
        a second auxiliary passage for guiding said air in a direction reversed to said direction toward said hole.

2. The air flow measuring apparatus according to claim 1, wherein said aperture has a longitudinal shape in a direction of insertion of said auxiliary passage member into said hole.

3. The air flow measuring apparatus according to claim 1, wherein said second auxiliary passage is provided with an outlet opened toward said air passage wall.

4. An air flow measuring apparatus, comprising:
    a housing with an electric circuit installed therein,
    a member defining an auxiliary passage,
    a detecting element disposed within said auxiliary passage,
    wherein said housing, said auxiliary passage and said detecting element are integral, and said auxiliary passage defining member is insertable from a hole at an air passage wall;
    said auxiliary passage comprising,
        a U-shaped auxiliary passage having two connected passages extending in a direction of insertion of said auxiliary passage defining member is inserted, and
        an aperture section mounted at a passage located at an upstream side out of said two passages so as to be opened toward an upstream portion of said air passage for communicating with the air flow flowing in said air passage.

5. The air flow measuring apparatus according to claim 4, wherein said aperture section is elongated in the direction of insertion of said auxiliary passage defining member.

6. The air flow measuring apparatus according to claim 4, wherein an outlet opened toward said air passage wall is provided at the passage located at a downstream side of said two passages.

7. An air flow measuring apparatus, comprising:
    a housing with an electric circuit installed therein,
    a member defining an auxiliary passage,
    a detecting element disposed within said auxiliary passage,
    wherein said housing, said auxiliary passage and said detecting element are integral, and said auxiliary passage defining member is insertable into a hole mounted at an air passage wall;

said auxiliary passage comprising,
- a U-shaped auxiliary passage having two connected passages extending in the direction of insertion of said auxiliary passage defining member, and a length of the passage located at an upstream side of said two passages is shorter than a passage located at a downstream side of said two passages.

8. The air flow measuring apparatus according to claim 7, wherein an outlet opened toward said air passage wall is provided at the passage located at the downstream side of said two passages.

9. An air flow measuring apparatus, comprising:

a housing with an electric circuit installed therein, a member defining an auxiliary passage, a detecting element disposed within said auxiliary passage, wherein said housing, said auxiliary passage and said detecting element are integral, and said auxiliary passage defining member is insertable from a hole at an air passage wall;

said auxiliary passage comprising,
- a vertical wall mounted at the portion adjacent to an inlet of said auxiliary passage in an axial direction of said air passage, and
- a guiding wall for guiding dynamic pressure from the air flow by said vertical wall to said auxiliary passage.

10. The air flow measuring apparatus according to claim 9, wherein said vertical wall, said guiding wall, and said auxiliary passage composing member are integral and constituted by the same material.

11. An air flow measuring apparatus, comprising:

a housing with an electric circuit installed therein, a base portion having a generally cylindrical shape at a bottom surface of said housing, an auxiliary passage including at least one bent portion configured by a substantially vertical surface to a main passage, intake air into said auxiliary passage being advanced along with a front surface of said vertical surface upwardly and a back surface of said vertical surface downwardly, wherein said auxiliary passage is integral with said housing, and said apparatus is configured to be insertable into a hole at an intake duct.

* * * * *

UNITED STATES PATENT AND TRADEMARK OFFICE
CERTIFICATE OF CORRECTION

PATENT NO. : 6,189,379 B1
DATED : February 20, 2001
INVENTOR(S) : Shinya Igarashi et al.

It is certified that error appears in the above-identified patent and that said Letters Patent is hereby corrected as shown below:

<u>Title page,</u>
Item [60] the following should read as follows:

[60] Continuation of application No., 09/112,144 filed on July 9, 1998, now Patent 5,939,628, which is a division of application No. 08/452,867, filed on May 30, 1995, now Patent No. 5,789,673, which is a continuation-in-part of application No. 08/120,542, filed on September 14, 1993, now Patent No. 5,467,648.

Signed and Sealed this

Thirtieth Day of October, 2001

*Attest:*

NICHOLAS P. GODICI
*Attesting Officer*     Acting Director of the United States Patent and Trademark Office